US008054820B2

(12) United States Patent
Park

(10) Patent No.: US 8,054,820 B2
(45) Date of Patent: Nov. 8, 2011

(54) METHOD AND APPARATUS FOR SYNCHRONIZING TIME INFORMATION IN A MOBILE COMMUNICATION TERMINAL

(75) Inventor: Jin-Ho Park, Seoul (KR)

(73) Assignee: Samsung Electronics Co., Ltd (KR)

( * ) Notice: Subject to any disclaimer, the term of this patent is extended or adjusted under 35 U.S.C. 154(b) by 979 days.

(21) Appl. No.: 11/638,850

(22) Filed: Dec. 14, 2006

(65) Prior Publication Data

US 2007/0133501 A1 Jun. 14, 2007

(30) Foreign Application Priority Data

Dec. 14, 2005 (KR) ........................ 10-2005-0123481

(51) Int. Cl.
*H04J 3/06* (2006.01)
*G04B 19/22* (2006.01)

(52) U.S. Cl. .......................................... 370/350; 368/21

(58) Field of Classification Search .................. 370/350; 368/21

See application file for complete search history.

(56) References Cited

U.S. PATENT DOCUMENTS

| | | | | |
|---|---|---|---|---|
| 6,903,683 | B1 | 6/2005 | Nicholson | |
| 6,963,588 | B1 * | 11/2005 | Lynch et al. | 370/516 |
| 7,069,055 | B1 * | 6/2006 | Lee | 455/566 |
| 2002/0098857 | A1 * | 7/2002 | Ishii | 455/502 |
| 2002/0181333 | A1 * | 12/2002 | Ito et al. | 368/21 |
| 2003/0026225 | A1 * | 2/2003 | Ogino et al. | 370/335 |
| 2003/0174700 | A1 * | 9/2003 | Ofek et al. | 370/389 |
| 2004/0083159 | A1 * | 4/2004 | Crosby et al. | 705/37 |
| 2004/0103444 | A1 * | 5/2004 | Weinberg et al. | 725/132 |
| 2004/0233902 | A1 * | 11/2004 | Medhat | 370/375 |
| 2005/0237995 | A1 * | 10/2005 | Puranik | 370/350 |
| 2006/0002236 | A1 * | 1/2006 | Punkka | 368/21 |

FOREIGN PATENT DOCUMENTS

| | | |
|---|---|---|
| EP | 1 307 063 | 5/2003 |
| EP | 1 478 164 | 11/2004 |
| FR | 2 784 760 | 4/2000 |

* cited by examiner

*Primary Examiner* — Erika Gary
*Assistant Examiner* — Michael Mapa
(74) *Attorney, Agent, or Firm* — The Farrell Law Firm, P.C.

(57) ABSTRACT

A method and apparatus for synchronizing time information in a mobile communication terminal. The terminal stores region-by-region time offset information, information about decoding schemes used for radio time signal stations for broadcasting Universal Time Coordinated (UTC) information, and information about carrier frequency bands for transmitting standard time information from the radio time signal stations. When moving to a region of a different time zone, the terminal detects its movement and receives location information from a base station of a mobile communication network in the current region. The terminal retrieves information about a carrier frequency from information relative to an associated radio time signal station, and receives a radio time signal from the radio time signal station. The terminal's Real Time Clock (RTC) is initialized according to the radio time signal and time information of the RTC is updated using time information of an associated region.

16 Claims, 4 Drawing Sheets

METHOD AND APPARATUS FOR SYNCHRONIZING TIME INFORMATION IN A MOBILE COMMUNICATION TERMINAL

PRIORITY

This application claims priority under 35 U.S.C. §119 to an application entitled "Method and Apparatus for Synchronizing Time Information in a Mobile Communication Terminal" filed in the Korean Intellectual Property Office on Dec. 14, 2005 and assigned Serial No. 2005-123481, the contents of which are incorporated herein by reference.

BACKGROUND OF THE INVENTION

1. Field of the Invention

The present invention relates generally to a mobile communication terminal, and in particular, to an apparatus and method the technology for time setting in a mobile communication terminal.

2. Description of the Related Art

Conventionally, mobile communication terminals based on a synchronous system as in a Code Division Multiple Access (CDMA) system receive time information from base stations in which they have been registered and then synchronize their time information, such that the time information is synchronized to a local time of an associated region at any time. However, unlike the synchronous system some mobile communication networks based on an asynchronous system do not provide time and date information (hereinafter, time information) in a region where a mobile communication terminal is currently located. When the mobile communication terminals using the asynchronous system (hereinafter, mobile communication terminals) move to a region of a different time zone, the users are not provided the correct time information of the current region. Thus, the users of the mobile communication terminals must manually correct internal times according to a time zone of an associated region.

There is a problem in that the users must manually perform a time synchronization process. Furthermore, there is another problem in that the manually performed time synchronization process can be incorrect, for instance when a reference clock is incorrect or the users are unfamiliar with a time information setting process.

Various methods have been provided for addressing these problems. A typical method receives a Short Message Service (SMS) message including time information from a Base Station (BS) to update internal time information of the mobile communication terminal, or updates internal time information of the mobile communication terminal according to location information received from the base station.

In the method using the SMS message, when the mobile communication terminal of the user moves to a region of a different time zone, the BS of the region in which the terminal is currently located automatically detects the movement to the different time zone and either transmits time information according to a time zone of the current region or provides the mobile communication terminal with time information in response to a request of the terminal. In another time synchronization method, the mobile communication terminal is provided with a time information Database (DB) containing time offset information relative to a time zone of each region. When moving to a region of a different time zone, the mobile communication terminal receives location information from the base station in the current region, retrieves time offset information relative to the received location information from the time information DB, and updates time information therein.

The method using the SMS message significantly relies on a mobile communication network. In order to fully utilize this method, the mobile communication network must be provided with additional functions such as a function for detecting that a particular mobile communication terminal enters a region of a different time zone when a BS transmits time information through automatic detection and a loop back function for providing time information relative to a time zone of the current region as a response to a request of the mobile communication terminal, as well as additional structures for performing the additional functions.

In the method using the SMS message, the SMS message is not exchanged in real time, and therefore, a predetermined time taken to completely exchange the SMS message corresponds to delay. Thus, there is a decrease in accuracy of newly set time information.

Alternatively, whether the time information of the mobile communication terminal is updated after the time information of a time zone of an associated region is detected using location information provided from the base station, there is still a decrease in the accuracy of time information. This is because the time information is updated on the basis of time information output from a Real Time Clock (RTC) for generating the time information inside the mobile communication terminal. This method updates the time information of the mobile communication terminal by incrementing or decrementing a value of the time information output from the RTC according to a time zone of a region in which the terminal is currently located. In this case, when the time information output from the RTC is incorrect, the time information provided from the mobile communication terminal is also incorrect.

In the mobile communication terminal based on the asynchronous system, the user directly provides time information and therefore the RTC maintains the time information. In this case, the user is to manually input initial time information. Thus, the accuracy of time information in the mobile communication terminal depends on the user's skill level or the accuracy of the user's reference clock.

SUMMARY OF THE INVENTION

It is, therefore, an object of the present invention to provide an apparatus and method for synchronizing time information that can update internal time information of a mobile communication terminal based on an asynchronous system such that the internal time information is correctly synchronized to a local time of a time zone of a current region when the terminal moves to a region of a different time zone.

It is another object of the present invention to provide an apparatus and method that can correctly synchronize internal time information of a mobile communication terminal based on an asynchronous system to a local time of a time zone of a current region when the terminal moves to a region of a different time zone, without an additional function and component in an existing mobile communication network.

In accordance with an aspect of the present invention, there is provided an apparatus for synchronizing time information in a mobile communication terminal, including: a memory for storing region-by-region time offset information between a Universal Time Coordinated (UTC) and local times of time zones used in regions and information relative to radio time signal stations for transmitting radio time signals to broadcast UTC information on a region-by-region basis; a baseband processor for receiving a radio time signal from an associated radio time signal station using information relative to the radio time signal station applied from a controller of the mobile communication terminal; a radio time signal decoder for decoding the radio time signal using the information relative to the radio time signal station applied from the controller when receiving the radio time signal from the baseband processor; and the controller for retrieving the information relative to the radio time signal station of a region where the mobile communication terminal is currently located, applying the retrieved information to the baseband processor and the radio time signal decoder, initializing an internal time of the mobile communication terminal to the UTC using the decoded radio time signal, and synchronizing the internal time of the mobile communication terminal to a local time of a time zone of the current region using time offset information relative to the current region among the region-by-region time offset information.

In accordance with still another aspect of the present invention, there is provided an apparatus for synchronizing time information in a mobile communication terminal, including: a memory for storing information relative to radio time signal stations for transmitting local time information according to time zones used in regions on a region-by-region basis; a baseband processor for receiving a radio time signal from an associated radio time signal station using information relative to the radio time signal station applied from a controller of the mobile communication terminal; a radio time signal decoder for decoding the radio time signal using the information relative to the radio time signal station applied from the controller when receiving the radio time signal from the baseband processor; and the controller for retrieving the information relative to the radio time signal station of a region where the mobile communication terminal is currently located, applying the retrieved information to the baseband processor and the radio time signal decoder, and synchronizing an internal time of the mobile communication terminal to a local time of a time zone of the current region using the decoded radio time signal.

In accordance with another aspect of the present invention, there is provided a method for synchronizing an internal time to a local time of a time zone of a current region in a mobile communication terminal for storing region-by-region time offset information between a Universal Time Coordinated (UTC) and local times of time zones used in regions and information relative to radio time signal stations for transmitting radio time signals to broadcast UTC information on a region-by-region basis. The method includes receiving location information from a mobile communication BS in the current region; retrieving information relative to a radio time signal station for transmitting a radio time signal in the current region from the information relative to the radio time signal stations; receiving the radio time signal using the retrieved information relative to the radio time signal station; decoding the radio time signal using the retrieved information relative to the radio time signal station when the radio time signal is received; initializing the internal time of the mobile communication terminal according to the UTC using the decoded radio time signal; and performing a synchronization process for setting the internal time of the mobile communication terminal using time offset information relative to the current region in the mobile communication terminal.

In accordance with yet another aspect of the present invention, there is provided a method for synchronizing an internal time to a local time of a time zone of a current region in a mobile communication terminal for storing information relative to radio time signal stations for transmitting time information according to time zones used in regions on a region-by-region basis. The method includes receiving location information from a mobile communication base station in the current region; retrieving information relative to a radio time signal station for transmitting a radio time signal in the current region where the mobile communication terminal is located, from the information relative to the radio time signal stations; receiving the radio time signal using the retrieved information relative to the radio time signal station; decoding the radio time signal using the retrieved information relative to the radio time signal station when the radio time signal is received; and performing a synchronization process for setting the internal time of the mobile communication terminal using the time signal and time offset information relative to the current region where the mobile communication terminal is located.

BRIEF DESCRIPTION OF THE DRAWINGS

The above and other objects and aspects of the present invention will be more clearly understood from the following detailed description taken in conjunction with the accompanying drawings, in which.

DETAILED DESCRIPTION OF THE PREFERRED EMBODIMENTS

Figure 1:
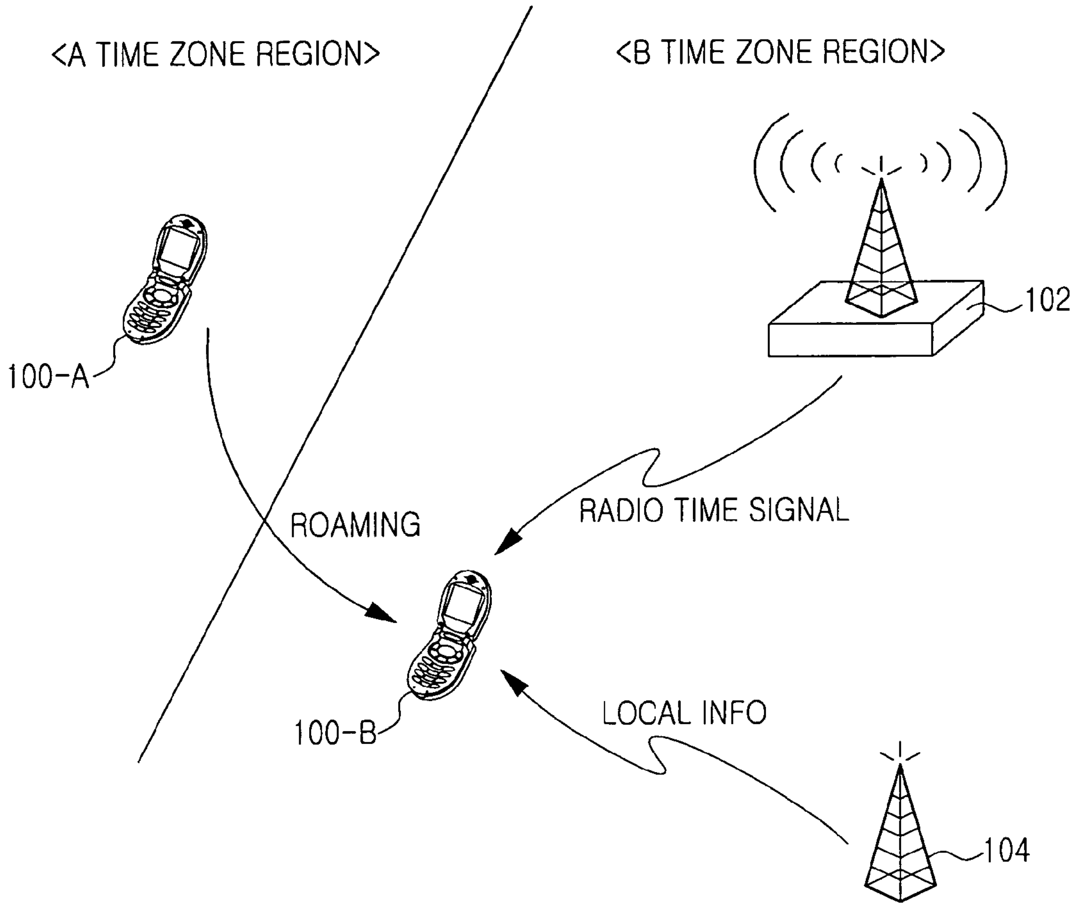
FIG. 1 illustrates a structure for receiving location information and a radio time signal when a mobile communication terminal moves to a region of a different time zone in accordance with the present invention.

Preferred embodiments of the present invention will be described in detail herein below with reference to the accompanying drawings. In the drawings, the same or similar elements are denoted by the same reference numerals even though they are depicted in different drawings. In the following description, detailed descriptions of functions and configurations incorporated herein that are well known to those skilled in the art are omitted for clarity and conciseness.

In the present invention, local time information of a time zone of an associated region as well as a Universal Time Coordinated (UTC) time can be directly received and employed in a radio time signal. For convenience, it is assumed that the radio time signal is transmitted wirelessly as UTC information.

First, the basic principle of the present invention will be described herein. In accordance with the present invention, a mobile communication terminal stores region-by-region time offset information between the UTC and local times of time zones used in regions, and information relative to radio time signal stations for transmitting radio time signals to broadcast UTC information and local times of time zones of regions on a region-by-region basis. When moving to a region of a different time zone, the mobile communication terminal detects its movement and receives location information from a BS of a mobile communication network in the current region, i.e., the region of the different time zone. Moreover, the mobile communication terminal retrieves information about a carrier frequency of the radio time signal from information relative to an associated radio time signal stations, receives a radio time signal from the radio time signal station, sets a Real Time Clock (RTC) inside the mobile communication terminal in response to the received radio time signal, detects a time offset between time information based on the current location information and time information based on the radio time signal, and updates internal time information of the terminal on the basis of the time offset. In the present invention, even though the BS of the mobile communication network is not provided with an additional component for setting time information of the mobile communication terminal, time information correctly synchronized to a local time of a time zone of the current region can be provided to a user when the terminal moves to a different region.

FIG. 1 illustrates a structure for receiving location information from a BS of an associated region and receiving a radio time signal from a radio time signal station of an associated region when the mobile communication terminal moves to a region of a different time zone in accordance with the present invention.

Conventionally, when the mobile communication terminal is powered on or a handover for the terminal occurs, the terminal makes a request for registration in a BS that currently provides a signal with high reception sensitivity. The registration request is made also when the mobile communication terminal moves to a region of a different time zone. When moving to the region of the different time zone, the mobile communication terminal is registered in the BS of the region of the different time zone. When the mobile communication terminal is registered, the BS of the associated region registers the terminal in the mobile communication network and provides location information in the current region, in order to provide the user with a mobile communication service. In the following description, it is assumed that the mobile communication terminal in accordance with the present invention moves from “A” Time Zone Region to “B” Time Zone Region.

In FIG. 1, when a mobile communication terminal 100 in accordance with the present invention moves from “A” Time Zone Region (where a terminal 100-A is located) to “B” Time Zone Region (where a terminal 100-B is located), the mobile communication terminal 100-B transmits a registration request to a BS 104 of “B” Time Zone Region. In response to the registration request, the BS 104 registers the mobile communication terminal 100-B in a mobile communication network of “B” Time Zone Region. Location information of the BS 104 is transmitted to the mobile communication terminal 100-B. Herein, the location information includes at least one of a country code value, a provider code of an associated mobile communication network, and unique information of the BS. Using the location information, the mobile communication terminal 100-B can know a current region, an associated country, and a provider of a mobile communication network in which the terminal is registered. Upon receiving the location information from the BS 104, the mobile communication terminal 100-B retrieves information relative to a radio time signal station of the current region using the location information.

Radio time signal broadcasting is used to give notification of current correct time information using a radio wave. When the mobile communication terminal receives the radio time signal broadcasting, the correct time information can be generated. This radio time signal is broadcast from a radio time signal station 102 that differs according to a current country or time zone region. The radio time signal station 102 transmits the radio time signal relative to a correct reference time using a very precise atomic clock such as a cesium atomic clock in 24 hours. Herein, the radio time signal basically includes hour, minute, and second pulse information, Binary Coded Decimal (BCD) time code information, a time offset between the UTC and Universal Time (UT), and voice guidance information.

Alternatively, a carrier frequency for broadcasting the radio time signal from the radio time signal station 102 may differ according to a country or time zone region. Table 1 shows an example of radio time signal stations and carrier frequencies that differ according to regions.

TABLE 1

| Country | Radio Time Signal Station | Standard Institute | Carrier Frequency |
|---|---|---|---|
| Korea | HLA | KRISS | 5 MHz |
| USA | WWVB | NIST | 60 KHz |
| China | BPC | NTSC | 68.5 KHz |
| Germany | DCF77 | PTB | 77.5 KHz |
| Switzerland | HBG | METAS | 75 KHz |
| Japan | JJY | NICT | 40 KHz, 60 KHz |
| United Kingdom | NSF | NPL | 60 KHz |

Time code information included in the radio time signal received through the carrier frequency has many formats. Formats of the time code information is defined in a time code format standard such as the Inter-Range Instrumentation Group (IRIG) 200-95 standard. Each country selects and employs one of the formats defined in the standard. Accordingly, the radio time signal broadcast from the radio time signal station 102 is differentially decoded according to each country or time zone region. In accordance with the present invention, the mobile communication terminal 100 stores information about different carrier frequency bands and decoding schemes of the radio time signals as information relative to radio time signal stations according to countries or time zone regions. Herein, the information relative to the radio time signal stations can be constructed in a Database (DB) containing information about decoding schemes and carrier frequencies used for the radio time signal stations.

In accordance with the present invention, the mobile communication terminal 100 detects a current region using location information received from the BS 104 and then retrieves information about a carrier frequency band for broadcasting a radio time signal from the radio time signal station 102 and information about a decoding scheme of a radio time signal broadcast from the radio time signal station 102 from the information relative to the radio signal time signal stations according to the current region. Using the retrieved information, the mobile communication terminal 100 receives and decodes the radio time signal from the radio time signal station 102.

In accordance with the present invention, the mobile communication terminal 100 synchronizes its internal time information to the radio time signal, i.e., the UTC, using the decoded radio time signal. A time offset between a local time of the current region and the UTC is extracted from region-by-region time offset information. The internal time information of the mobile communication terminal is updated according to the time offset. When a time zone is changed, the mobile communication terminal 100 can provide the user with time information correctly synchronized to the local time of the time zone of the current region. A structure of the mobile communication terminal 100 in accordance with the present invention will be described in detail with reference to FIG. 2.

Figure 2:
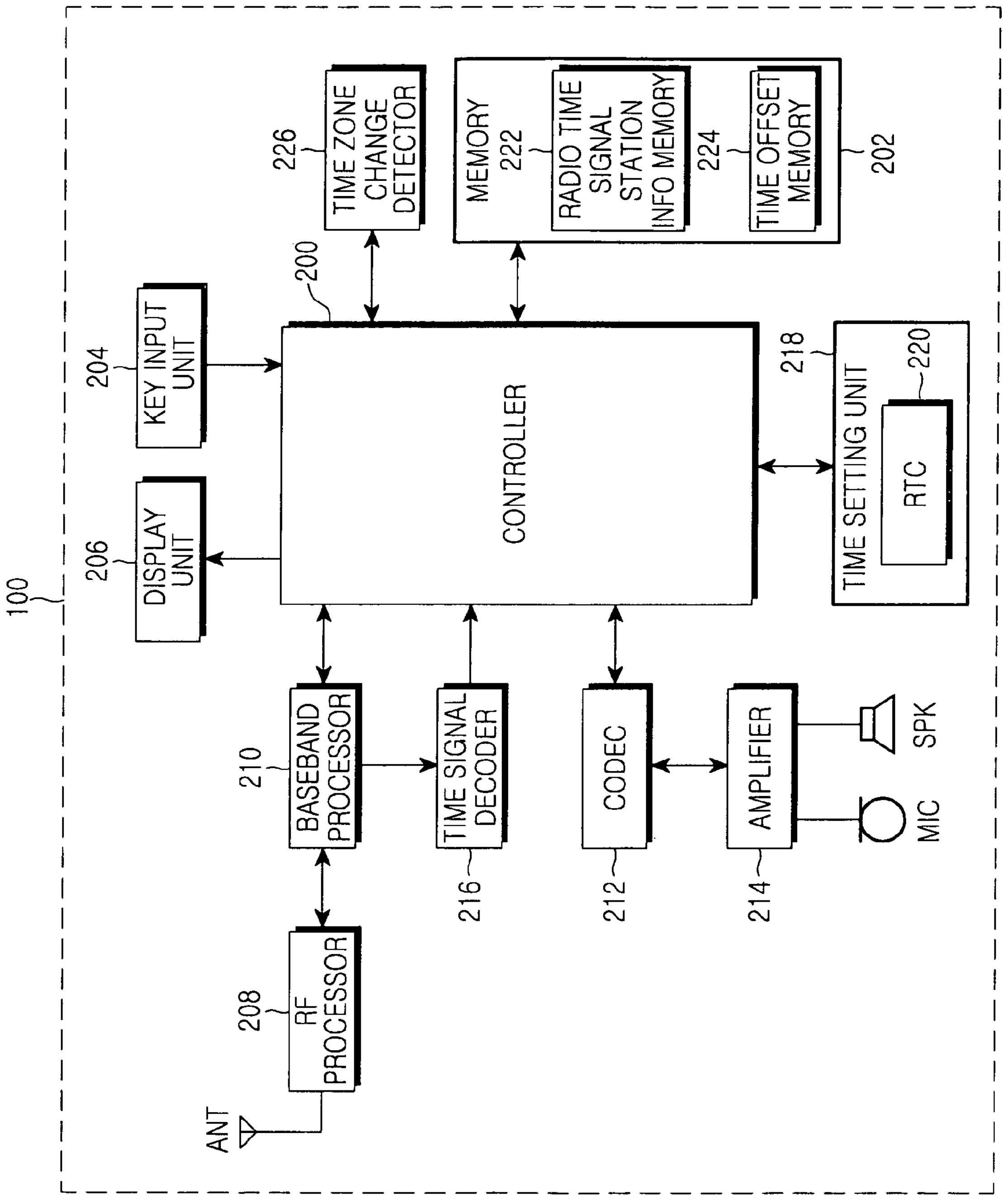
FIG. 2 is a block diagram illustrating a structure of the mobile communication terminal in accordance with the present invention.

FIG. 2 is a block diagram illustrating the structure of the mobile communication terminal in accordance with the present invention.

In the mobile communication terminal 100 of FIG. 2, a controller 200 is connected to a memory 202, a key input unit 204, a display unit 206, a baseband processor 210, a Coder-Decoder (CODEC) 212, a radio time signal decoder 216, and a time setting unit 218. Herein, the controller 200 controls respective components of the mobile communication terminal for performing a phone call or data communication and voice signal and data processing according to a wireless Internet access protocol. Moreover, the controller 200 receives the user's key input from the key input unit 204 and controls the display unit 206 to generate and provide image information in response to the user's key input.

The controller 200 determines whether the terminal has moved to a different region. A method for determining whether the terminal has moved to the different region employs location information received from the BS 104. That is, the received location information is compared with the previously received location information. When two location information elements are different, the controller 200 determines that the terminal has moved to the different region.

In this case, the controller 200 retrieves information relative to the radio time signal station 102 of the current region from the memory 202. Herein, the controller 200 can update internal time information in response to a change of the time zone region after determining whether the current region is a different time zone region.

The controller 200 extracts the information relative to the radio time signal station 102 according to the current region retrieved from the memory 202, i.e., information about a decoding scheme and a carrier frequency for transmitting a radio time signal from the radio time signal station 102. Using the carrier frequency, the radio time signal is received from the radio time signal station 102. The decoding scheme relative to the radio time signal station 102 is set in the radio time signal decoder 216. The radio time signal decoder 216 decodes the received radio time signal.

The controller 200 applies the decoded radio time signal to the time setting unit 218. The time setting unit 218 sets an initial time value using the applied radio time signal and initializes a Real Time Clock (RTC) 220. The RTC 220 automatically updates an internal time in every second and maintains the internal time of the mobile communication terminal 100. Thus, the RTC 220 of the mobile communication terminal 100 is synchronized to the UTC.

The controller 200 loads time offset information between the UTC and a local time of the current region from the memory 202. Then, the loaded time offset information is applied to the time setting unit 218. The time setting unit 218 increments/decrements a value of time information of the RTC 220 using the applied time offset information. Thus, the internal time of the mobile communication terminal 100 is synchronized to the local time of the current region. The controller 200 outputs time information synchronized to the local time of the time zone of the current region to the display unit 206. In accordance with the present invention, the mobile communication terminal 100 can provide its time information correctly synchronized to a local time of a time zone of a current region whether moving to a region of a different time zone.

The memory 202 of FIG. 2 stores information relative to country-by-country radio time signal stations, carrier frequency information for transmitting radio time signals from the radio time signal stations, and decoding scheme information for decoding the radio time signals received from the radio time signal stations as information relative to the radio time signal stations. The memory 202 stores time offset information between the UTC and local times of regional-by-region time zones. A storage area of the memory 202 for storing the information relative to the radio time signal stations is referred to as a radio time signal station information memory 222. A storage area of the memory 202 for storing the time offset information between the UTC and the local times of the regional-by-region time zones is referred to as a region-by-region time offset memory 224.

The memory 202 is provided with a Read Only Memory (ROM), a flash memory, a Random Access Memory (RAM), etc. The ROM stores a program for processing and controlling by the controller 200 and various reference data. The RAM provides a working memory of the controller 200, and the flash memory provides an area for storing various data capable of being updated.

The key input unit 204 is provided with various keys including number keys, and provides a key input from the user to the controller 200. A Radio Frequency (RF) processor 208 transmits an RF signal to and receives an RF signal from the BS. The RF processor 208 converts the received signal to an Intermediate Frequency (IF) signal and then outputs the IF signal to the baseband processor 210 connected to the controller 200. The RF processor 208 converts an IF signal input from the baseband processor 210 to an RF signal, and then transmits the RF signal.

The baseband processor 210 serves as a Baseband Analog Application Specific Integrated Circuit (ASIC) for providing an interface between the controller 200 and the RF processor 208. The baseband processor 210 converts a digital baseband signal applied from the controller 200 to an analog IF signal and then applies the analog IF signal to the RF processor 208. The baseband processor 210 converts an analog IF signal applied from the RF processor 208 to a digital baseband signal and then applies the digital baseband signal to the controller 200. In accordance with the present invention, the controller 200 sets a carrier frequency of the radio time signal station 102 of the current region, receives a radio time signal from the radio time signal station 102, and applies the received radio time signal to the radio time signal decoder 216.

The radio time signal decoder 216 supports decoding schemes used for various radio time signal stations, and decodes the radio time signal input through the baseband processor 210 according to one of the decoding schemes selected by the controller 200. Thereafter, the radio time signal decoder 216 outputs the decoded radio time signal to the controller 200.

The time setting unit 218 initializes the RTC 220 according to UTC information input from the controller 200. The time setting unit 218 updates time information of the RTC 220 according to region-by-region time offset information input from the controller 200. The time information input from the RTC 220 is output to the controller 200.

The CODEC 212 connected to the controller 200 is coupled to a microphone and a speaker through an amplifier 214. The CODEC 212 performs a Pulse Code Modulation (PCM) encoding process for a voice signal input from the microphone and then outputs audio data to the controller 200. The CODEC 212 performs a PCM decoding process for audio data input from the controller 200 and outputs an audio signal to the speaker through the amplifier 214. The amplifier 214 amplifies an audio signal input from the microphone or an audio signal to be output to the speaker. Volume of the speaker and gain of the microphone are adjusted according to control of the controller 200.

Even though a BS for the mobile communication terminal is changed, a determination is made as to whether the current region is a region of a different time zone. Time information can be updated only when the time zone has changed. In accordance with the present invention, the controller 200 of the mobile communication terminal 100 does not need to update time information when a time zone of the current region is equal to that of the previous region although at least one of a country code, a provider code, and unique information of the BS has changed. The time information does not need to be updated, whether the radio time signal stations of particular geographical regions such as Seoul in Korea and Tokyo in Japan are different.

In contrast, when multiple time zones are present in one country such as in the U.S.A., the time information can be updated only when the terminal moves to a region of a different time zone. In accordance with the present invention, the mobile communication terminal 100 is further provided with a time zone change detector 226. When time offset information relative to the current region is compared with that relative to the previous region, time offsets are different from each other, such that internal time information of the terminal 100 can be updated.

It is assumed that the case where time information is updated when one of a country code, a provider code, and a unique code of a BS is changed is a first preferred embodiment of the present invention. Furthermore, it is assumed that the case where a time zone is changed after a change of the time zone is checked in the time zone change detector 226 and internal time information of the mobile communication terminal 100 is changed is a second preferred embodiment of the present invention.

Figure 3:
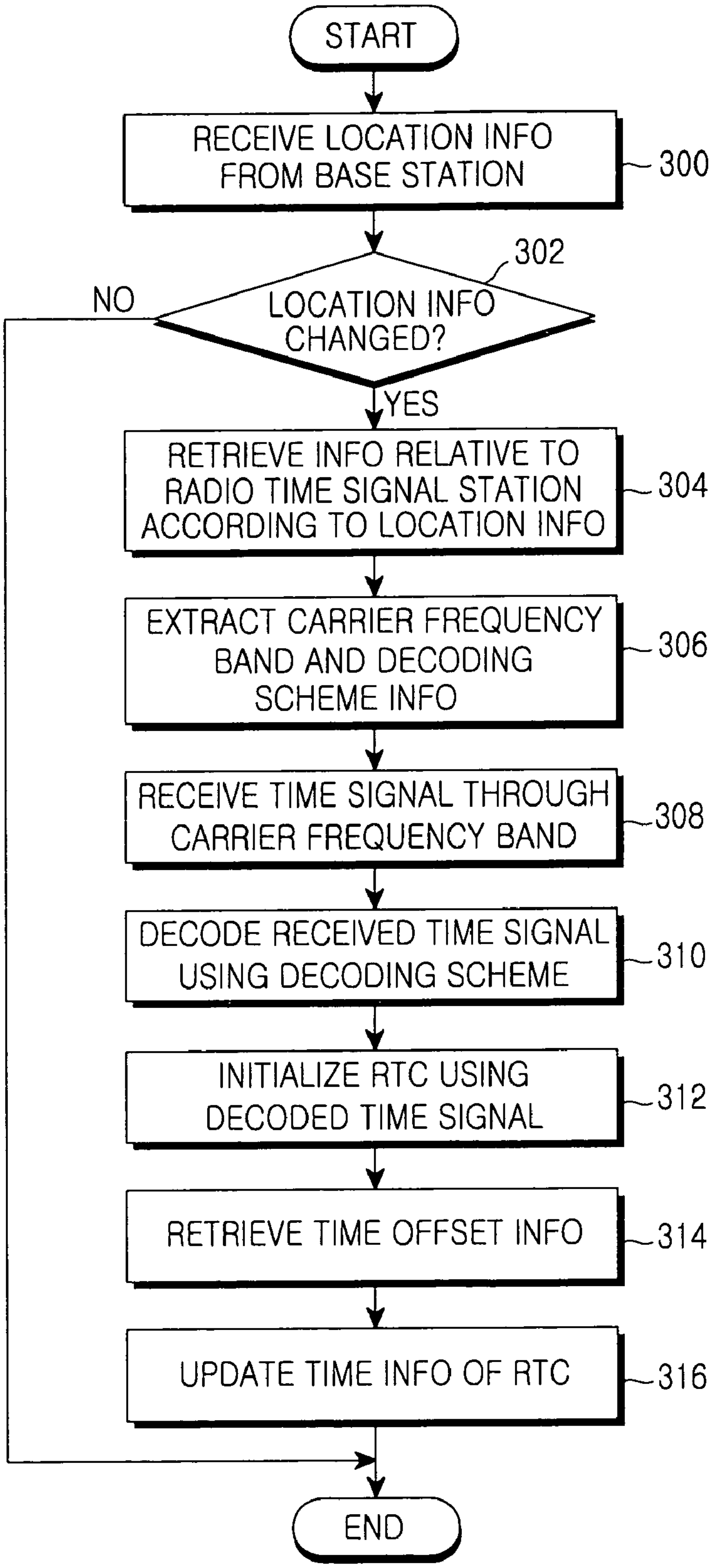
FIG. 3 is a flowchart illustrating an operation process for synchronizing time information according to a time zone of an associated region in the mobile communication terminal in accordance with a first preferred embodiment of the present invention.

FIG. 3 is a flowchart illustrating an operation process for synchronizing time information according to a time zone of an associated region in the mobile communication terminal in accordance with the first preferred embodiment of the present invention.

In FIG. 3, when the controller 200 of the mobile communication terminal 100 in accordance with the first preferred embodiment of the present invention is powered on or a handover or roaming occurs, location information is received from a BS of the current region in step 300. Herein, the location information includes a code of a country where the BS for transmitting the location information is located, a code of a mobile communication provider to which the BS belongs, and unique information of the BS. The controller 200 proceeds to step 302 to compare the currently received location information with the previously received location information. According to a comparison result in step 302, the controller 200 can determine whether the terminal 100 has moved to a different region.

If the currently received location information is different from the previously received location information as the comparison result in step 302, the controller 200 determines that the terminal 100 has moved to a different region. In step 304, the controller 200 retrieves information relative to a radio time signal station of the associated region mapped to the currently received location information from the radio time signal station information memory 222. Then, the controller 200 proceeds to step 306 to extract a carrier frequency band for broadcasting a radio time signal to the current region from the currently retrieved information relative to the radio time signal station. Thereafter, the controller 200 proceeds to step 308 to receive the radio time signal through the extracted carrier frequency band.

Then, the controller 200 proceeds to step 310 to decode the radio time signal received in step 308 according to extracted decoding scheme information. The controller 200 next proceeds to step 312 to initialize the RTC 220 using the decoded radio time signal according to the UTC included in the decoded radio time signal.

Thereafter, the controller 200 proceeds to step 314 to retrieve time offset information in the region mapped to the received location information from region-by-region time offset information of the region-by-region time offset memory 224 of the memory 202. Herein, the region-by-region time offset information includes time offset information between the UTC and a local time of the time zone of the region where the mobile communication terminal 100 is currently located.

The controller 200 proceeds to step 316 to update time information of the RTC 220 according to the retrieved time offset information. That is, a value of the time information of the RTC 220 is incremented/decremented according to the retrieved time offset information in step 316. In accordance with the first preferred embodiment of the present invention, the mobile communication terminal 100 initializes the RTC 220 according to the current UTC received from the radio time signal station 102 for broadcasting the radio time signal, and updates internal time information according to time zone of the current region, thereby providing the correct time information in the region where the user is currently located.

In accordance with the present invention, the mobile communication terminal 100 is further provided with the time zone change detector 226. The internal time information can be updated according to changed time zone when a BS for the terminal 100 is changed in a power-on state or a handover or roaming.

Figure 4:
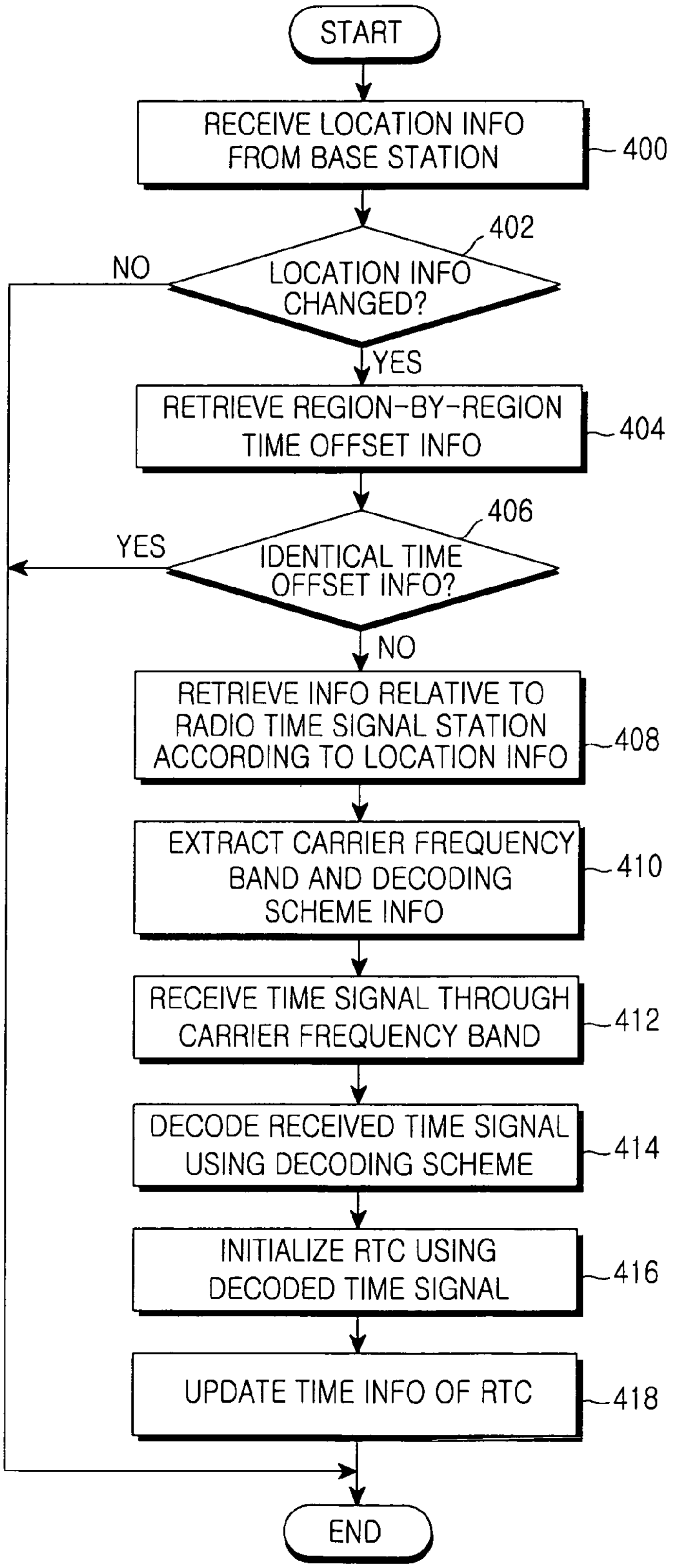
FIG. 4 is a flowchart illustrating an operation process for synchronizing time information according to a time zone of an associated region to which the mobile communication terminal moves in accordance with a second preferred embodiment of the present invention.

FIG. 4 is a flowchart illustrating an operation process for synchronizing time information according to a time zone of an associated region to which the mobile communication terminal moves in accordance with the second preferred embodiment of the present invention.

In FIG. 4, the controller of the mobile communication terminal in accordance with the second preferred embodiment proceeds to step 400 to receive location information from a BS of a current region when a power-on state or a handover or roaming occurs as in the first preferred embodiment of the present invention. In accordance with the second preferred embodiment of the present invention, the controller of the mobile communication terminal proceeds to step 402 to compare the currently received location information with the previously received location information.

According to a comparison result in step 402, the controller of the mobile communication terminal of the second preferred embodiment of the present invention (hereinafter, controller of the second embodiment) can determine whether the terminal has moved to a different region. If the location information is changed as the comparison result in step 402, the controller of the second embodiment determines that the terminal has moved to a different region. In step 404, the controller of the second embodiment retrieves time offset information mapped to the location information received in step 400 from the memory. In step 406, the controller of the second embodiment determines whether time offset information set in the time setting unit of the mobile communication terminal is equal to that retrieved in step 404. Then, if the time offset information is identical as a determination result in step 406, the controller of the second embodiment determines that the terminal is located in the same time zone and ends an operation for updating the internal time information.

If the time offset information is not identical as the determination result in step 406, the controller of the second embodiment proceeds to step 408 to retrieve information relative to a radio time signal station of a region mapped to the location information received in step 400. The controller of the second preferred embodiment proceeds to step 410 to extract information about a carrier frequency for broadcasting a radio time signal to the current region where the mobile communication terminal is located and information about a decoding scheme used for the radio time signal station from the retrieved information relative to the radio time signal station.

Then, the controller of the second embodiment proceeds to step 412 to receive the radio time signal through the carrier frequency extracted in step 410. Then, the controller of the second embodiment proceeds to step 414 to decode the received radio time signal using the extracted decoding scheme information.

Then, the controller of the second embodiment proceeds to step 416 to extract UTC information from the decoded signal. The RTC of the mobile communication terminal of the second embodiment of the present invention is initialized on the basis of the extracted UTC information. The controller of the second embodiment proceeds to step 418 to update time information of the RTC using the time offset information retrieved in step 404 in relation to a time zone of a region where the mobile communication terminal is located. That is, a value of the time information of the RTC is incremented/decremented according to the retrieved time offset information. Even through the mobile communication terminal of the second preferred embodiment of the present invention has moved to a different region, the internal time information is updated only when a time zone of the current region is different from that of the previous region. When the update of the internal time information is unnecessary, the mobile communication terminal of the second embodiment does not perform the update.

Although exemplary embodiments of the present invention have been disclosed for illustrative purposes, those skilled in the art will appreciate that various modifications, additions, and substitutions are possible, without departing from the scope. Specifically, the second embodiment of the present invention determines whether time offset information is identical between regions such that a determination is made as to whether a changed BS is located in the same time zone. Of course, a determination can be made as to whether the changed BS is located in the same time zone by retrieving a DB that contains information about region-by-region time zones and information about the same time zone relative to each region.

The present invention can update internal time information of a mobile communication terminal based on an asynchronous system such that the internal time information is correctly synchronized to a local time of a time zone of a current region when the terminal moves to a region of a changed time zone.

Moreover, the present invention can correctly synchronize internal time information of a mobile communication terminal based on an asynchronous system to a local time of a time zone of a current region when the terminal moves to a region of a changed time zone, without an additional function and component in an existing mobile communication network.

In the present invention, it is assumed that the mobile communication terminal receives a UTC in a radio time signal. Alternatively, a radio time signal station may directly broadcast a correct local time of an associated region as well as the UTC in the radio time signal. In this case, the mobile communication terminal in accordance with the present invention can update an internal time of the mobile communication terminal using local time information according to the received radio time signal when detecting that the radio time signal received from the radio time signal station is the local time information. Therefore, the present invention is not limited to the above-described embodiments, but is defined by the following claims, along with their full scope of equivalents.

What is claimed is:

1. An apparatus for synchronizing time information in a mobile communication terminal, comprising:

a memory for storing region-by-region time offset information between a Universal Time Coordinated (UTC) and local times of time zones used in regions and information relative to radio time signal stations for wirelessly transmitting radio time signals to broadcast UTC information on a region-by-region basis;

a baseband processor for receiving a radio time signal from an associated radio time signal station using information relative to the radio time signal station applied from a controller of the mobile communication terminal;

a radio time signal decoder for decoding the radio time signal using the information relative to the radio time signal station applied from the controller when receiving the radio time signal from the baseband processor; and the controller for retrieving the information relative to the radio time signal station of a region where the mobile communication terminal is currently located, applying the retrieved information to the baseband processor and the radio time signal decoder, initializing an internal time of the mobile communication terminal to the UTC time using the decoded radio time signal, synchronizing the internal time of the mobile communication terminal to a local time of a time zone of the current region using time offset information relative to the current region among the region-by-region time offset information, and initializing a Real Time Clock (RTC) inside the mobile communication terminal to the UTC time, wherein the baseband processor receives the radio time signal from the radio time signal station, the information relative to the radio time signal station including information about a carrier frequency that was used to transmit the radio time signal from the associated radio time signal station to the current region of the mobile communication terminal, and decoding information for decoding the radio time signal transmitted from the radio time signal station.

2. The apparatus of claim 1, wherein the controller retrieves the information relative to the radio time signal station of the current region when the mobile communication terminal moves to a different region, applies the retrieved information to the baseband processor and the radio time signal decoder, initializes the internal time of the mobile communication terminal to the UTC time using the decoded radio time signal, and synchronizes the internal time of the mobile communication terminal to the local time of the time zone of the current region using time offset information relative to the current region among the region-by-region time offset information.

3. The apparatus of claim 2, wherein the controller determines that the mobile communication terminal has moved to the different region when location information received from a base station is different from previously received location information.

4. The apparatus of claim 3, wherein the location information comprises at least one of a country code of the base station, a provider code of a mobile communication network relative to the base station, and unique information of the base station.

5. The apparatus of claim 1, further comprising:

a time zone change detector for detecting a change of a time zone by determining whether time offset information in a region mapped to location information currently received by the mobile communication terminal is identical with that in a region mapped to previously received location information.

6. The apparatus of claim 5, wherein the controller synchronizes the internal time of the mobile communication terminal to the local time of the time zone of the current region according to a detection result when a region in which the mobile communication is located has changed.

7. An apparatus for synchronizing time information in a mobile communication terminal, comprising:

a memory for storing information relative to radio time signal stations for transmitting local time information according to time zones used in regions on a region-by-region basis;

a baseband processor for receiving a radio time signal from an associated radio time signal station using information relative to the radio time signal station applied from a controller of the mobile communication terminal;

a radio time signal decoder for decoding the radio time signal using the information relative to the radio time signal station applied from the controller when receiving the radio time signal from the baseband processor; and the controller for retrieving the information relative to the radio time signal station of a region where the mobile communication terminal is currently located, applying the retrieved information to the baseband processor and the radio time signal decoder, synchronizing an internal time of the mobile communication terminal to a local time of a time zone of the current region using the decoded radio time signal, and initializing a Real Time Clock (RTC) inside the mobile communication terminal to Universal Time Coordinated (UTC) time, wherein the baseband processor receives the radio time signal from the radio time signal station, the information relative to the radio time signal station including information about a carrier frequency that was used to transmit the radio time signal from the associated radio time signal station to the current region of the mobile communication terminal, and decoding information for decoding the radio time signal transmitted from the radio time signal station.

8. A method for synchronizing an internal time to a local time of a time zone of a current region in a mobile communication terminal for storing region-by-region time offset information between the Universal Time Coordinated (UTC) time and local times of time zones used in regions and information relative to radio time signal stations for transmitting radio time signals to broadcast UTC information on a region-by-region basis, the method comprising:

receiving location information from a mobile communication base station in the current region;

retrieving information relative to a radio time signal station for transmitting a radio time signal in the current region from the information relative to the radio time signal stations;

receiving the radio time signal using the retrieved information relative to the radio time signal station;

decoding the radio time signal using the retrieved information relative to the radio time signal station when the radio time signal is received;

initializing the internal time of the mobile communication terminal according to the UTC time using the decoded radio time signal;

performing a synchronization process for setting the internal time of the mobile communication terminal using time offset information relative to the current region in the mobile communication terminal, and initializing a Real Time Clock (RTC) inside the mobile communication terminal to the UTC time, wherein a baseband processor receives the radio time signal from the radio time signal station, the information relative to the radio time signal station including information about a carrier frequency that was used to transmit the radio time signal from the associated radio time signal station to the current region of the mobile communication terminal, and decoding information for decoding the radio time signal transmitted from the radio time signal station.

9. The method of claim 8, wherein receiving the location information further comprises:

receiving the location information from the base station of the current region;

comparing the received location information with previously received location information and determining whether the location information is identical; and determining whether the mobile communication terminal has moved to a different region according to a location information comparison result.

10. The method of claim 9, wherein the step of retrieving the information relative to the radio time signal station further comprises:

retrieving the information relative to the radio time signal station for transmitting the radio time signal in the region where the mobile communication terminal is currently located from the information relative to the radio time signal stations according to a result of determining whether the mobile communication terminal has moved to the different region.

11. The method of claim 8, wherein the mobile communication terminal is provided with a time zone change detector for detecting a change of a time zone by determining whether time offset information in a region mapped to location information currently received in the mobile communication terminal is identical with that in a region mapped to previously received location information.

12. The method of claim 11, wherein the step of receiving the location information further comprises:

receiving the location information from the base station of the current region;

comparing the received location information with the previously received location information and determining whether the location information is identical;

retrieving the time offset information mapped to the received location information from the region-by-region time offset information according to a location information comparison result;

detecting the time zone change by determining whether the retrieved time offset information is identical with that in the region mapped to the previously received location information; and determining whether the mobile communication terminal has moved to a time zone of a different region according to whether the time offset information is identical.

13. The method of claim 12, wherein the step of retrieving the information relative to the radio time signal station further comprises:

retrieving the information relative to the radio time signal station for transmitting the radio time signal in the region where the mobile communication terminal is currently located from the information relative the radio time signal stations according to a result of determining whether the mobile communication terminal has moved to the time zone of the different region.

14. The method of claim 8, wherein the step of performing the synchronization process further comprises:

incrementing/decrementing a value of time information of the initialized RTC according to the time offset information relative to the current region in the mobile communication terminal.

15. The method of claim 8, wherein the location information comprises at least one of a country code of the base station, a provider code of a mobile communication network relative to the base station, and unique information of the base station.

16. A method for synchronizing an internal time to a local time of a time zone of a current region in a mobile communication terminal for storing information relative to radio time signal stations for transmitting time information according to time zones used in regions on a region-by-region basis, the method comprising:

receiving location information from a mobile communication base station in the current region;

retrieving information relative to a radio time signal station for transmitting a radio time signal in the current region where the mobile communication terminal is located, from the information relative to the radio time signal stations;

receiving the radio time signal using the retrieved information relative to the radio time signal station;

decoding the radio time signal using the retrieved information relative to the radio time signal station when the radio time signal is received;

initializing a Real Time Clock (RTC) inside the mobile communication terminal to Universal Time Coordinated (UTC) time; and performing a synchronization process for setting the internal time of the mobile communication terminal using the decoded radio time signal and time offset information relative to the current region where the mobile communication terminal is located, wherein a baseband processor receives the radio time signal from the radio time signal station, the information relative to the radio time signal station including information about a carrier frequency that was used to transmit the radio time signal from the associated radio time signal station to the current region of the mobile communication terminal, and decoding information for decoding the radio time signal transmitted from the radio time signal station.

* * * * *